US012789773B2

(12) United States Patent
Agha

(10) Patent No.: US 12,789,773 B2

(45) Date of Patent: Nov. 10, 2026

(54) ASSEMBLY FOR A BRAKING SYSTEM FOR A VEHICLE AND METHOD OF ASSEMBLING A MULTILAYER DEVICE

(71) Applicant: ZF CV Systems Global GmbH, Bern (CH)

(72) Inventor: Samer Agha, Wroclaw (PL)

(73) Assignee: ZF CV Systems Global GmbH, Bern (CH)

( * ) Notice: Subject to any disclaimer, the term of this patent is extended or adjusted under 35 U.S.C. 154(b) by 351 days.

(21) Appl. No.: 18/425,240

(22) Filed: Jan. 29, 2024

(65) Prior Publication Data

US 2024/0255014 A1 Aug. 1, 2024

(30) Foreign Application Priority Data

Jan. 30, 2023 (EP) .................................... 23153919

(51) Int. Cl.

| | |
|---|---|
| ***B60T 8/36*** | (2006.01) |
| ***B29C 45/14*** | (2006.01) |
| ***B29C 45/72*** | (2006.01) |
| ***B60R 16/023*** | (2006.01) |
| ***B62D 5/04*** | (2006.01) |
| *B29C 45/00* | (2006.01) |
| *B29L 31/16* | (2006.01) |
| *B29L 31/30* | (2006.01) |

(52) U.S. Cl.

CPC ...... *B60T 8/3675* (2013.01); *B29C 45/14311* (2013.01); *B29C 45/14467* (2013.01); *B29C 45/7207* (2013.01); *B29C 2045/0093* (2013.01); *B29C 2045/14327* (2013.01); *B29C 2045/1454* (2013.01); *B29L 2031/16* (2013.01); *B29L 2031/30* (2013.01)

(58) Field of Classification Search

CPC ............... B60T 8/3675; B60R 16/0239; B29C 45/14311; B29C 45/14467; B29C 45/7207; B62D 5/0406

See application file for complete search history.

(56) References Cited

U.S. PATENT DOCUMENTS 6,028,770 A * 2/2000 Kerner ................. H05K 5/0082 174/16.3

6,164,732 A * 12/2000 Tominaga ............. B60T 15/028 303/119.2

(Continued)

FOREIGN PATENT DOCUMENTS

WO WO-2025209659 A1 * 10/2025 ............. B60T 7/042

*Primary Examiner* — Thomas W Irvin

(74) *Attorney, Agent, or Firm* — Dickinson Wright PLLC

(57) ABSTRACT

An assembly for a braking system for a vehicle, in particular utility vehicle is provided. The assembly is adapted for holding and fixing at least a first component and a second component, and the assembly includes a base element and a first clamping feature, arranged so that at least one edge area of said first component and/or said second component is clamped by said first clamping feature. To improve the fixation and clamping of the internal components, said assembly also includes at least a rivet-shaped second clamping feature. The base element, the first clamping feature, and the rivet-shape second clamping feature may be integrally formed via injection molding around and/or through the first and second component.

25 Claims, 2 Drawing Sheets

(56) References Cited

U.S. PATENT DOCUMENTS

| | | | | |
|---|---|---|---|---|
| 6,924,985 | B2 * | 8/2005 | Kawakita | H05K 7/20854 318/722 |
| 7,207,634 | B2 * | 4/2007 | Yamabuki | B29C 66/114 303/119.3 |
| 7,237,850 | B2 * | 7/2007 | Sanada | B60T 8/3675 303/119.2 |
| 7,643,297 | B2 * | 1/2010 | Tominaga | B62D 5/0406 165/80.2 |
| 9,286,744 | B2 * | 3/2016 | Montarou | E05B 19/043 |
| 2005/0082265 | A1 * | 4/2005 | Yamabuki | B29C 66/9241 219/121.64 |
| 2005/0167183 | A1 * | 8/2005 | Tominaga | H02K 11/33 180/444 |
| 2006/0076825 | A1 * | 4/2006 | Sanada | B60T 8/3675 303/119.3 |
| 2008/0278918 | A1 * | 11/2008 | Tominaga | B62D 5/0406 361/719 |
| 2013/0044446 | A1 * | 2/2013 | Montarou | E05B 19/043 361/752 |
| 2016/0128208 | A1 | 5/2016 | Bolik | |

* cited by examiner

ASSEMBLY FOR A BRAKING SYSTEM FOR A VEHICLE AND METHOD OF ASSEMBLING A MULTILAYER DEVICE

BACKGROUND

The present disclosure relates to an assembly for a braking system for a vehicle, in particular utility vehicle, wherein the assembly is adapted for holding and fixing at least a first component and a second component. The assembly includes a base element and a first clamping feature, arranged so that at least one edge area of said first component and/or said second component is clamped by said first clamping feature.

SUMMARY

Assemblies of the type described above are known and can be used as a housing component for electronics in a control system of a braking system for utility vehicles. The assemblies can also refer throughout the document for over-molded assemblies. The assembly can be adapted for holding and fixing multiple internal components. According to the state of the art, to ensure proper positioning of the assembled internal components, the assembly has a clamping feature, applying all-around edge clamping of the internal components.

However, an insufficient holding effect is observed for the assembled internal components, using this all-around edge clamping geometry of the assembly. This effect is manifested in material separation between the assembly and the edge parts all-around of the internal components.

SUMMARY

The present disclosure is therefore based on the object of overcoming the above-mentioned disadvantage as far as possible and enriching the state of the art. In particular, the object of the present disclosure is to further design an assembly for a braking system for a vehicle, in particular a utility vehicle, of the type mentioned above in such a way, that the fixation and clamping of internal components in the assembly is improved.

The present disclosure solves the object on which it is based by an assembly for a braking system for a vehicle, in particular a utility vehicle, of the type mentioned above with the features described herein, as well as the further objects and features described herein. In particular, the assembly provides at least a rivet-shaped second clamping feature.

According to the present disclosure, an assembly for a braking system for a vehicle, in particular a utility vehicle, is provided. The assembly is adapted for holding and fixing at least a first component and a second component, and includes a base element and a first clamping feature, arranged so that at least one edge area of said first component and/or said second component is clamped by said first clamping feature, wherein the assembly provides at least a rivet-shaped second clamping feature.

The present disclosure is based on the realization that the holding effect, in which internal components are fixed and clamped in the assembly by edge clamping, can be improved, when adding an additional clamping feature to the geometry of the assembly. The special rivet-shaped geometry of the additional clamping feature creates in an advantageous way an opposing surface to the base element on that side of the internal components facing away from the base element. This results in a better holding of the whole inner assembly by increasing the adhesion reactionary forces between the internal components.

The assembly may be used as a housing for electronics in a control system of a braking system for a vehicle, in particular a utility vehicle. In particular, the assembly may be used for an axle valve package of the braking system. It is also conceivable that the assembly may be used for a trailer control module (TCM). As a housing, the assembly can be adapted for holding and fixing a plurality of components, but at least a first component and a second component, as internal components. These components may represent an inner assembly. The first component may be arranged on top of the base element of the assembly. The second component may be arranged on top of the first component and/or on one side of the first component facing away from the base element of the assembly. Further components, if provided, may be arranged accordingly on top of the second component. “On top” is to be interpreted with respect to a gravity force.

In one or more embodiments of the present disclosure, the first clamping feature and the rivet-shaped second clamping feature are formed in a single manufacturing step. In particular, the first clamping feature and the rivet-shaped second clamping feature are formed by performing an injection molding step, wherein the molten material (see below for the information on the material) is formed over the first and second components. In common parlance, the injection molding step can be referred to as “over-molding” step, wherein molten material is molded over a component and is configured to fill the space between the component and an injection molding tool.

In an advantageous embodiment, the first component, the second component, the first clamping feature, and the rivet-shaped second clamping feature are comprised of a same material. Despite the fact that the first and second components being made of the same material, after curing, the newly molten material is capable of molding over the first and second components and holding them together. In particular, said components are held together when the newly molten material molds over the first and second components.

The present disclosure, thus, enables the technical advantage in that by designing the first and second components with appropriate molding and/or tooling provisions such as holes that allow the molten material to pass through, the first and second components are held together by the newly formed clamping features when the molten material solidifies on cooling. Such a technique is particularly advantageous when the sensitive electronic components (e.g., lead frame elements of an electronic circuitry) are to be held between said first and second components, the usage of same material to form the clamping features will prevent usage of external fastening devices such as screws. Such external mechanical fasteners may not be desirable in all conditions. Further, by using the same material for the first and second components as well as the clamping features, the present disclosure also simplifies the assembling process and time expensive analysis on structural rigidity of the assembled structure.

In accordance with one or more embodiments discussed above, the material for making the first clamping feature and the rivet-shaped second clamping feature is Polybutylene Terephthalate (PBT) reinforced with Glass Fibre (GF). It is also preferred when approximately 30 percent of GF is reinforced with PBT to form the first clamping feature and the rivet-shaped second clamping feature. In accordance with an embodiment, the percent of GF usage in combination with PBT for the clamping features can be different in comparison to the percent of GF used in the first and second components.

In a preferred embodiment said second clamping feature comprises a shaft part and a head part. The shaft part can extend through the first component and the second component. Said head part is arranged at an end of said shaft part facing away from said base element. In particular, the head part can be arranged on that side of the second component facing away from the first component and the base element. The head part can have a wider diameter compared to the shaft part. In this way, the shaft part and the head part of the second clamping feature can help to prevent the first component and the second component from detaching from the assembly.

In another preferred embodiment said second clamping feature is located at at least one portion of said base element. In this way, the first component and the second component are also fixed in the approximately center area, but other areas can also be envisaged. At the same time or in an alternative embodiment said first clamping feature is shaped so that said first clamping feature grasps at least said edge area of said first component and said second component. In particular, the first clamping feature can be arranged so that the first clamping feature grasps an edge area all around the first component and the second component. In this way, the first component and the second component are well fixed around the entire outer edge area.

In another preferred embodiment said base element and said first clamping feature and said second clamping feature are integrally one-piece formed. At the same time or in an alternative embodiment said shaft part and said head part of said second clamping feature are integrally one-piece formed. This allows an easy fabrication of the assembly, comprising the respective elements, in particular by an injection assembling process. In addition, this can advantageously increase a stability of the assembly because the individual elements do not have to be subsequently connected to each other.

In another preferred embodiment a plurality of clamping features are provided, wherein each of the clamping features is shaped according to said second clamping feature. In this way, the holding function of internal components can be further improved. The further clamping features can be arranged in a distributed manner on the base element of the assembly. In particular, the further clamping features can be arranged evenly distributed on the base element.

In another preferred embodiment said assembly is set up to accommodate electric leads. The electric leads can be arranged between the first component and the second component. The electrical leads can be used advantageously to conduct electrical current between a pressure sensor and a solenoid valve.

In a further aspect, the present disclosure relates to a braking system, comprising the above-described assembly. The preferred embodiments or variations described for the assembly are also preferred embodiments of the braking system.

In a further aspect, the present disclosure relates to a vehicle, in particular a utility vehicle, having the above-described assembly. The preferred embodiments or variations described for the assembly are also preferred embodiments of the vehicle, in particular a utility vehicle.

In a further aspect, the present disclosure relates to a method of assembling a multilayer device, in which at least a first component and a second component are provided, and in which the above-described assembly is assembled around said first component and said second component. In particular the assembly is assembled around said first component and said second component by an injection assembling process. The preferred embodiments or variations described for the assembly are also preferred embodiments of multilayer device. The first component and the second component can be prefabricated components. The first component and the second component can have the appropriate holes for the rivet-shaped clamping feature of the assembly. The first component and the second component can have the appropriate holes for the number of rivet-shaped clamping features of the assembly. The assembly can be an injection assembled part. The assembly can be poured in form of liquid plastic in an injection assembly, which temporarily fixes the first and the second component. Thereby the assembly can be assembled around the first component and the second component by an injection assembling process. When cooling, the assembly can shrink. This can advantageously create the clamping force to fix the first component and the second component, exerted by the first clamping feature and the second clamping feature.

BRIEF DESCRIPTION OF THE DRAWINGS

In the following, embodiments of the present disclosure are described in more detail with reference to the attached drawings.

DETAILED DESCRIPTION

Figure 1:
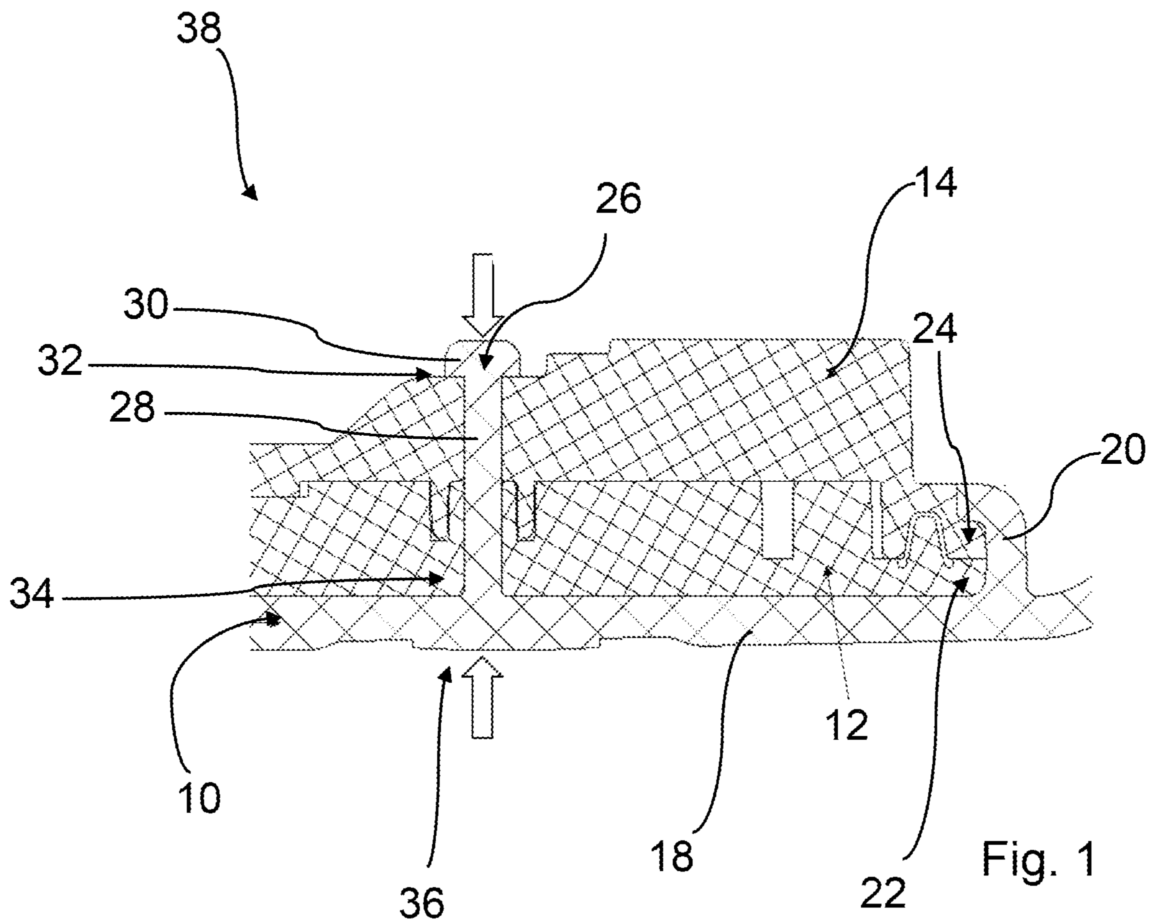
FIG. 1 is a schematic sectional view of a partial area of an assembly according to the present disclosure.

Referring to FIG. 1, a schematic sectional view of a partial area of an assembly 10 for a braking system 150 (FIG. 2) for a vehicle 200*a* (FIG. 2), in particular a utility vehicle 200*b* (FIG. 2), according to one embodiment of the present disclosure is shown. The vehicle 200*a*, in particular the utility vehicle 200*b*, is hereinafter referred to as the vehicle 200*a*, 200*b*.

The assembly 10 is an injection molded component. In particular, the assembly 10 is assembled from plastic. In the embodiment, the assembly 10 is a housing component for electronics in a control system 154 (FIG. 2) of the braking system 150. In particular, the assembly 10 may be used for an axle valve package 156 (FIG. 2) of the braking system 150.

Figure 2:
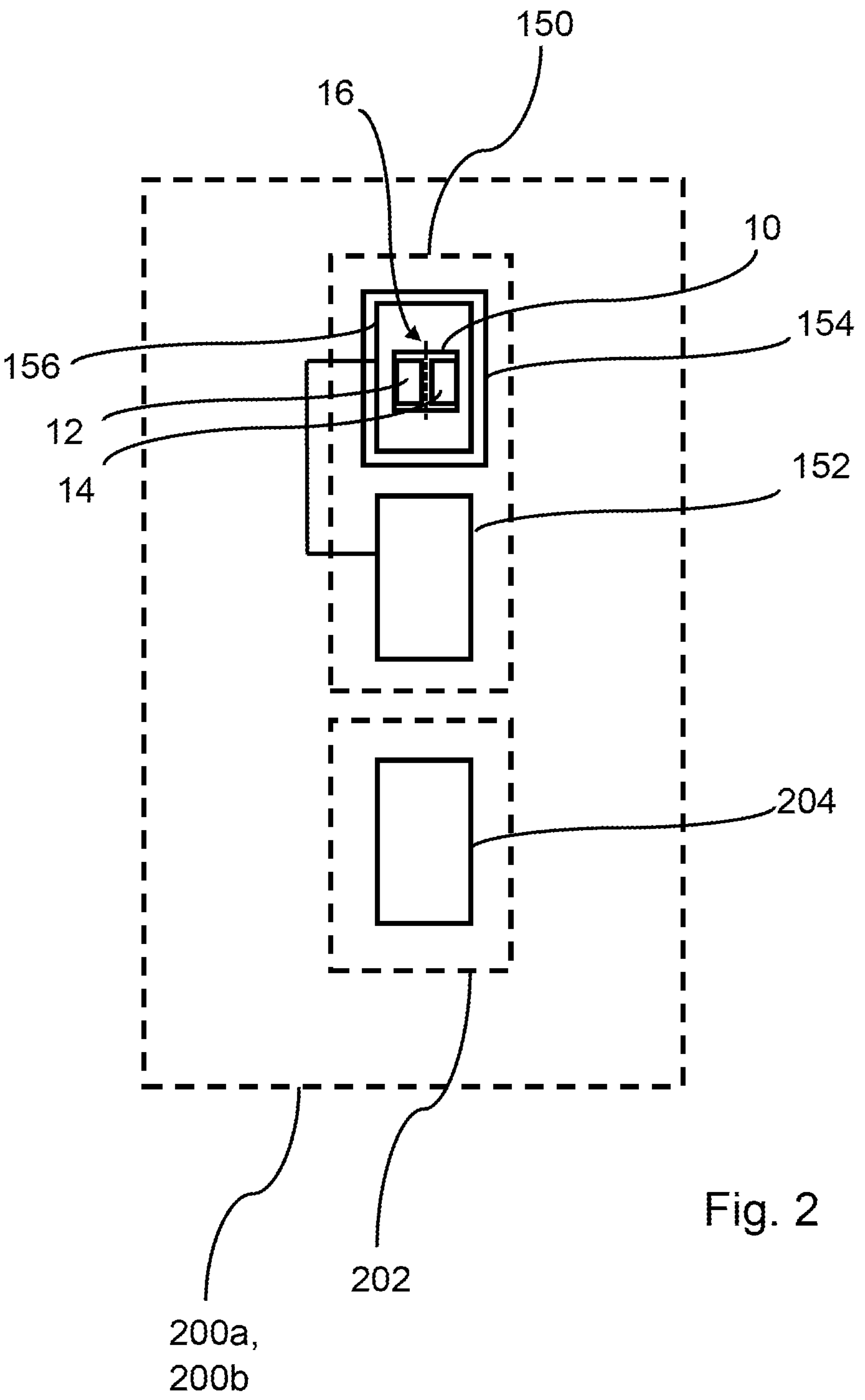
FIG. 2 is a schematic representation of a utility vehicle according to one embodiment of the present disclosure.

The assembly 10 is adapted for holding and fixing a first component 12 and a second component 14. The first component 12 and the second component 14 are prefabricated components in the control system 154 of the braking system 150. Between the first component 12 and the second component 14, electric leads 16 (FIG. 2, illustrated schematically by a dashed line) are arranged. The electrical leads 16 are used to conduct electrical current between pressure sensors and solenoids, not shown in the figures, of the axle valve package 152.

The assembly 10 includes a base element 18. Further, the assembly 10 includes a first clamping feature 20. The first clamping feature 20 is arranged so that an edge area 22 of the first component 12 is clamped by the first clamping feature 20. In particular, the first clamping feature 20 is arranged so that the first clamping feature 20 grasps an edge area all around the first component 12. Further, the first clamping feature 20 is arranged so that an edge area 24 of the second component 14 is clamped by the first clamping feature 20. In particular, the first clamping feature 20 is arranged so that the first clamping feature 20 grasps an edge area all around the second component 14.

Further, the assembly 10 provides a second clamping feature 26. The second clamping feature 26 is rivet shaped. The second clamping feature 26 includes a shaft part 28. Further, the second clamping feature 26 includes a head part 30. The head part 30 is arranged at a first end 32 of the shaft part 28, facing away from the base element 18. A second end 34 of the shaft part 28, facing away from the first end 32, is facing the base element 18. In the embodiment, the second clamping feature 26 is located at at least one portion, marked with reference sign "36" in FIG. 1, of the base element 18.

In the embodiment, the base element 18, the first clamping feature 20, and the second clamping feature 26 are integrally one-piece formed. Further, in the embodiment, the shaft part 28 and the head part 30 of the second clamping feature 26 are integrally one-piece formed.

The assembly 10, the first component 12, and the second component 14 form a multilayer device 38. The following describes how to assemble the multilayer device 38.

The first component 12 and the second component 14 are provided as prefabricated components. Both the first component 12 and the second component 14 have an appropriate recess or hole for the shaft 28 of the rivet-shaped second clamping feature 26 of the assembly 10. The first component 12 and the second component 14 are temporarily fixed in an injection assembly. The assembly 10, at this time in form of liquid or molten plastic, is poured in the injection assembly, and thereby assembled around the first component 12 and the second component 14 by way of an injection assembling process. Accordingly, the assembly 10 is manufactured later than first component 12 and the second component 14. When cooling, the assembly 10 shrinks. This shrinking creates a clamping force to fix the first component 12 and the second component 14, exerted by the first and the second clamping features 20, 26.

Referring to FIG. 2, a schematic representation of a vehicle 200*a*, in particular utility vehicle 200*b*, according to one embodiment of the present disclosure is shown. The vehicle 200*a*, in particular utility vehicle 200*b*, is hereinafter referred to as the vehicle 200*a*, 200*b*. The illustration is limited to the components related to the present disclosure. The vehicle 200*a*, 200*b* has, in addition to the components illustrated, further components necessary for the operation of the vehicle 200*a*, 200*b*. The illustration of such components has been omitted in favor of a concise presentation of the present disclosure.

The vehicle 200*a*, 200*b* comprises a drive system 202. In the present embodiment, the drive system 202 has one or more electric drives 204. The one or more electric drives 204 are configured to drive the vehicle 200*a*, 200*b*.

Further, the vehicle 200*a*, 200*b* includes a braking system 150. The braking system 150 includes brake 152, configured to delay a movement of the vehicle 200*a*, 200*b*. Further the braking system 150 includes a control system 154, to control the brake 152. The control system 154 includes the assembly 10, designed according to one of the preferred embodiments or embodiment forms described above.

LIST OF REFERENCE SIGNS (PART OF THE DESCRIPTION)

10 assembly
12 first component
14 second component
16 electric leads
18 base element
20 first clamping feature
22 edge area of the first component
24 edge area of the second component
26 second clamping feature
28 shaft
30 head part
32 first end of the shaft part
34 second end of the shaft part
36 center of the base
38 multilayer device
150 braking system
152 brake
154 control system
156 axle valve package
200*a* vehicle
200*b* utility vehicle
202 drive system
204 electric drive

The invention claimed is:

1. An assembly (10) for a braking system (150) for a vehicle (200*a*), the assembly (10) comprising:

a base element (18), a first clamping feature (20), and a rivet-shaped second clamping feature (26), wherein at least a first component (12) and a second component (12) are held and fixed together in the assembly (10), wherein at least one edge area (22, 24) of said first component (12) and/or said second component (14) is clamped by said first clamping feature (20);

wherein the first and second components have overlapping holes, wherein the rivet-shaped clamping feature extends through the overlapping holes.

2. The assembly (10) according to claim 1, wherein the first clamping feature (20) and the rivet-shaped second clamping feature (26) are integrally formed in a single manufacturing step.

3. The assembly (10) according to claim 2, wherein the first component, the second component, the first clamping feature, and the rivet-shaped second clamping feature are comprised of a same material.

4. The assembly (10) according to claim 3, wherein the same material for making the first clamping feature and the rivet-shaped second clamping feature is Polybutylene Terephthalate (PBT) reinforced with Glass Fiber (GF).

5. The assembly (10) according to claim 4, wherein approximately 30 percent of GF is reinforced with PBT to form the first clamping feature (20) and the rivet-shaped second clamping feature (26), and wherein the percent of GF usage in combination with PBT for the clamping features is different in comparison to a percent of GF used in the first and second components.

6. The assembly (10) according to claim 3, wherein the first and second clamping features are integrally formed and are non-integral relative to the first and second components.

7. The assembly (10) according to claim 1, wherein said second clamping feature (26) includes a shaft part (28) and a head part (30), wherein said head part (30) is arranged at an end (32) of said shaft part (28) facing away from said base element (18).

8. The assembly (10) according to claim 7, wherein said base element (18) and said first clamping feature (20) and said second clamping feature (26) are integrally formed and wherein said shaft part (28) and said head part (30) of said second clamping feature (26) are integrally formed.

9. The assembly (10) according to claim 1, wherein said second clamping feature (26) is located at at least one portion (36) of said base element (18) and/or said first clamping feature (20) is shaped so that said first clamping feature (12) grasps at least said edge area (22, 24) of said first component (12) and/or said second component (14).

10. The assembly (10) according to claim 1, wherein said assembly (10) accommodates electric leads (16) between the first component and the second component.

11. A braking system (150) including the assembly (10) according to claim 1.

12. A vehicle (200*a*) including the assembly (10) according to claim 1.

13. A method of assembling a multilayer device (38) having the assembly of claim 1, the method comprising:

providing at least the first component (12) and the second component (14);

performing an injection assembling process around said first component (12) and said second component (14); and assembling the assembly (10) according to claim 1.

14. The method according to claim 13, wherein the injection assembling process includes providing a molten material of the second clamping feature through the overlapping holes.

15. The method according to claim 13, wherein the injection assembling process includes overmolding the first and second components with a molten material of the first and second clamping features and subsequently cooling and shrinking the molten material and providing a clamping force on the first and second components during cooling.

16. The assembly (10) according to of claim 1, wherein the second component is disposed on top of the first component and disposed on the opposite side of the first component relative to the base element, wherein the first component is between the base element and the second component, and at least a portion of the first clamping feature and the second clamping feature are disposed on top of the second component to clamp the first and second components.

17. The assembly (10) according to of claim 1, wherein the first and second clamping features are integrally formed with the base element and extend upwardly from the base element.

18. The assembly (10) according to claim 1, wherein the first clamping feature extends all around an edge area of each of the first and second components.

19. The assembly (10) according to claim 1, wherein the second clamping feature extends through a middle section of the first and second components and the first clamping feature extends around a perimeter of the first and second components.

20. An assembly (10) for a braking system (150) for a vehicle (200*a*), the assembly (10) comprising:

a base element (18), a first clamping feature (20), and a rivet-shaped second clamping feature (26), wherein at least a first component (12) and a second component (12) are held and fixed together in the assembly (10), wherein at least one edge area (22, 24) of said first component (12) and/or said second component (14) is clamped by said first clamping feature (20);

wherein a plurality of second clamping features are provided, wherein each of the second clamping features includes a shaft portion and a head portion.

21. The assembly (10) according to claim 20, wherein the base element (18), the first clamping feature (20), and the rivet-shaped second clamping feature (26) are integrally formed.

22. The assembly (10) according to claim 20, wherein the first clamping feature (20) and the rivet-shaped second clamping feature (26) are formed by injection molding, wherein molten material is formed over the first and second components.

23. An assembly (10) for a braking system (150) for a vehicle (200*a*), the assembly (10) comprising:

a base element (18), a first clamping feature (20), and a rivet-shaped second clamping feature (26), wherein at least a first component (12) and a second component (12) are held and fixed together in the assembly (10), wherein at least one edge area (22, 24) of said first component (12) and/or said second component (14) is clamped by said first clamping feature (20);

wherein the first and second components include holes therethrough, wherein the second clamping feature extends through the holes and the first clamping features extends around edge areas of the first and second components.

24. The assembly (10) according to claim 23, wherein the base element (18), the first clamping feature (20), and the rivet-shaped second clamping feature (26) are integrally formed.

25. The assembly (10) according to claim 23, wherein the first clamping feature (20) and the rivet-shaped second clamping feature (26) are formed by injection molding, wherein molten material is formed over the first and second components.

* * * * *